US005734163A

United States Patent [19]

Hayashi et al.

[11] Patent Number: 5,734,163

[45] Date of Patent: Mar. 31, 1998

[54] ZERO METHOD OF CONTROLLING QUADRUPOLE MASS SPECTROMETER AND CONTROL CIRCUIT ARRANGEMENT TO CARRY OUT THIS METHOD

[75] Inventors: Tomonao Hayashi, Musashino; Osamu Tsukakoshi; Toshio Koike, both of Chigasaki; Takashi Kawashima, Tokorozawa, all of Japan

[73] Assignee: Nihon Shinku Gijutsu Kabushiki Kaisha, Kanagawa-ken, Japan

[21] Appl. No.: 707,462

[22] Filed: Sep. 4, 1996

[30] Foreign Application Priority Data

Sep. 5, 1995 [JP] Japan .................................... 7-228053

[51] Int. Cl.$^6$ ............................ B01D 59/44; H01J 49/00

[52] U.S. Cl. ............................................ 250/292; 250/282

[58] Field of Search ..................................... 250/282, 292

[56] References Cited

U.S. PATENT DOCUMENTS 3,784,814 1/1974 Sakai et al. ............................ 250/292

3,829,689 8/1974 Tsukakoshi et al. .................... 250/292

4,816,675 3/1989 Fies et al. .............................. 250/292

5,177,359 1/1993 Hiroki et al. ........................... 250/292

5,422,482 6/1995 Nakajima et al. ....................... 250/292

*Primary Examiner*—Bruce Anderson

*Attorney, Agent, or Firm*—Larson & Taylor

[57] ABSTRACT

A quadrupole mass spectrometer which gives a uniform mass separation over a large mass number range without being affected by the nob-linear characteristics of the components of a control circuit arrangement and comprises an all-solid-state control circuit by using an O-method according to the invention to compare the positive or negative peak value U+V or U−V of U+Vcosω t or the positive or negative peak value V−U or —U+V of —U−Vcosω t, U+Vcosω t and —U−Vcosω t being voltages given to two pairs of rods of a quadrupole section respectively, to reference voltage ($U_o$+$V_o$) or ($U_o$−$V_o$) or (—$U_o$+$V_o$) or (—$U_o$−$V_o$), $U_o$ and $V_o$ being a DC voltage and the peak value of RF voltage to which U and V should be controlled and minimize the difference between the peak value (RF+DC) voltages to the high precision reference voltages as mentioned above.

4 Claims, 17 Drawing Sheets

ZERO METHOD OF CONTROLLING QUADRUPOLE MASS SPECTROMETER AND CONTROL CIRCUIT ARRANGEMENT TO CARRY OUT THIS METHOD

BACKGROUND OF THE INVENTION

The present invention relates to a method of controlling a quadrupole mass spectrometer with an all-solid-state circuit so as to give a uniform mass separation over wide mass range for mass analysing of atomic and molecular ions of gaseous and evaporated solid substances and hence suitably be used for the analysis of constituent in rarefield gases typically observed on the analysing system of the atmosphere of satellites by artificial satellites, LC-MS, GC-MS, secondary ion mass spectrometry and other medical and industrial analytic applications. The present invention also relates to a control circuit arrangemt to be used for carrying out the method.

FIG. 1 of the accompanying drawings illustrates a typical arrangement of two pairs of electrode poles A1, A2, B1 and B2 having a shape of rectangular hyperbolic profile of the known quadrupole mass spectrometer. Voltages U+Vcosω t and -(U+Vcosω t) obtained by combining a DC voltage U and an RF voltage V in a specific way are applied to the electrodes to generate an electric field, and ions of gaseous substances and/or evaporated solid substances to be analyzed are focussed to the central portion of the entrance of the quadrupole section, while maintaining the ratio of the DC voltage U to a constant value and also maintaining the DC voltage U and the RF voltage to respective constant values, so that ions of only a selected substance may pass through the quadrupole section of the mass spectrometer for detection at one time. Alternatively, ions of different substances may be caused to pass through the quadrupole section in ascending order of mass numbers for detection by sweeping the absolute values of U and V, maintaining the ratio of U and V to an appropriate constant value so that a mass spectrum may be obtained as a result.

The motion of each ion in a quadrupole electric field is defined by equations of motion:

$$d^2x/d\xi^2+(a+2q\cos 2\xi)x=0 \quad (1)$$

and $$d^2y/d\xi^2-(a+2q\cos 2\xi)y=0 \quad (2),$$

provided that $\xi=\omega t/2$ $a=8eU/m\omega^2r_o^2$ $q=4eV/m\omega^2r_o^2$ where e is the electric charge of an ion, m is the mass of the ion, $2r_o$ is the distance between the summits of each pair of oppositely disposed hyperbolic columns ($r_o$ is referred to as a field radius).

In the following, possible stable regions of the above equations will be discussed by using the standard expression of the Mathieu's differential equation:

$$d^2w/d\zeta^2-(a'-q'\cos 2\zeta)w=0 \quad (3)$$

Equation (3) provides a stable solution when parameters a' and q' are contained in the stable region shown in FIG. 2. Then, solution w of equation (3) is always found within a range defined by finite values regardless of any increase in the value of ζ. If a' and q' are out of the stable region, w increases with ζ to expand the amplitude.

By comparing equation (1) with the standard equation (3), it will be found that, if a'=a>0 and q'=−q<0, only the portion of the stable region located in the fourth quadrant of FIG. 2 provides a stable region for equation (1). Similarly, only the portion of the stable region located in the second quadrant of FIG. 2 provides a stable region for equation (2). By overlapping them one on the other, stable regions are obtained for both x- and y- directions (see FIG. 3). If the portions are termed respectively as the first and second stable regions, only the first region is used for ordinary quadrupole mass spectrometers and part of the upper corner of the second region is used for the mass spectrometric observation of $D_2^=$ and $4He^+$ where a high resolution is required for low mass numbers in practical applications.

FIG. 4(A) illustrates the first stable region on a- and q-planes. FIG. 4(B) shows the relationship between the peak value of the DC voltage and that of the RF voltage to be applied to the quadrupole section in the stable region for singly charged ions with mass numbers of 1, 2, 3, . . . . In this region, the scanning line that can effectively separate adjacent mass numbers in a spectrum with a mass difference of $\Delta M_u$ for any adjacent mass numbers and produce a good transmission for the quadrupole section does not pass through the point of origin as in FIG. 4(A) but runs in parallel with the line obtained by connecting the peaks for mass numbers 1, 2, 3, . . . and expressed by equations:

$$U=1.2118M_u\upsilon^2r_o^2-0.699\upsilon^2r_o^2\Delta M_u \quad (4)$$

and $$V=7.2199M_u\upsilon^2r_o^2+1.2139\upsilon^2r_o^2\Delta M_u \quad (5),$$

where

υ is the frequency of the RF voltage in mega hertz and $2r_o$cm is the distance between the summits of each pair of oppositely disposed columns ($r_o$ is the field radius as defined above).

Thus, a mass spectrum comprising peaks arranged at mass separation of $\Delta M_u$ over the entire mass numbers can be obtained. When the mass separation is 1, the falling edge of each peak intersects the rising edge of the immediately adjacent peak at a point on base line. Equations of scan line on U, V plane is given by (4) and (5) by putting $\Delta M_u=1$. When $\Delta M_u=0.5$ skirt of the adjacent peaks is separated about $\Delta M_u=0.5$ at base line.

In order to carry out a sweep with the linear relationship defined by equations (4) and (5), the DC voltage U and the RF voltage V have to be swept with such a linear relationship.

There has been no control method that allows a sweep over a wide range of mass numbers with such a perfect linear relationship. FIGS. 5 and 6 illustrate a known control method. With this method, an RF voltage processed and amplified sequentially by a crystal oscillator C, a buffer amplifier D, a balanced modulator E, a linear amplifier F, a driving amplifier G and a power amplifier H illustrated in FIG. 5 is fed sequentially to a high voltage generating section, a detecting section and a DC overlaying section to produce voltages U+Vcosω t and -(U+Vcosω t) to be applied to the quadrupole section as shown in FIG. 6. Then, the RF voltage is detected by an RF voltage detection circuit I comprising a duplex diode shown in FIG. 6 and fed to a main control unit, which, upon comparing it with an external reference voltage, determines the difference therebetween, amplifies the difference and feeds it back to the balanced modulation circuit, while generating a DC voltage on the basis of the external reference voltage signal and carrying out a scanning operation along a scanning line as shown in FIG. 4(B) that ensures a linear relationship between U and V.

There arises a problem in detecting the RF voltage with the above described known method. Referring to FIG. 6 and according to the known method, the RF voltage coming from the RF power amplifier H (FIG. 5) is applied to the primary side of RF transformer J having a resonance circuit K on the secondary side to produce intended Vcosω t and —Vcosω t by regulating related variable capacitors. Then, voltages U+Vcosω t and —U−Vcosω t are prepared by overlaying DC voltages U and —U on the RF voltage and applied to the respective two pairs of rods of the quadrupole section. Of the voltages, only the RF voltage is divided by C2, C1; C4, C3 as shown in FIG. 6 to produce a voltage Vout from a circuit comprising a duplex diode 6AL5 in correspondence to the RF voltage. Then, the main control unit compares the voltage Vout with the external reference voltage and feeds back the balanced modulator circuit with the difference in order to minimize the difference. However, the rectifying circuit for the RF voltage does not operate to show a perfect linear relationship with the RF voltage and entails a non-linearity of about 3/1,000, which means that a perfectly uniform mass separation cannot be achieved over an extended mass range with this known method.

Therefore, there exists a demand for a method of controlling a quadrupole mass spectrometer that solves the above identified problem of the non-linear relationship between the RF voltage and the rectified voltage obtained by detecting and rectifying the RF voltage by means of a non-linear device and that of the non-linearity of about 3/1,000 and incapability of achieving a perfectly uniform mass separation over a wide mass range and hence a uniform mass separation in the order of one thousandth and stability of the order of $10^{-4}$ of the mass unit in the second stable region.

The incapability of the known method of achieving a linearly rectified voltage by means of a non-linear device will now be discussed in greater detail.

Referring to FIG. 6, in the operation of producing a rectified signal voltage corresponding to an RF voltage by dividing Vcosω t and —Vcosω t by respective capacitances, rectifying them by a duplex diode and passing them through a filter circuit, the instantaneous voltages and currents of the sections in FIG. 6 are determined by the following eighteen equations, where $G_1$ and $G_2$ are the perveances of the duplex diode.

$V_o \cos \omega t = q_1/C_1 + q_2/C_2$ $V_1 = i_2R_1 + i_5R_3 = q_1/C_1$ $i_1 + i_2 = -d(q_1 - q_2)/dt$ $i_1 = G_2V_1^{3/2}(V_1 > 0)$ (*)

$i_1 = 0\ (V_1 \leqq 0)$ (*)

$i_5R_3 = V_5 = Q_5/C_5$ $i_2 + i_4 - i_5 - i_6 = dq_5/dt = C_5dV_5/dt$ $V_5 - V = Ldi_6/dt$ $i_6 - i_7 = dq_6/dt$ $V = q_6/C_6 = i_7R_L$ $V_{out} = -\alpha V$ $\alpha = R_a/R_L$ $V_1 - V_5 = i_2R_1$ $-V_o \cos \omega t = q_3/C_3 + q_4/C_4$ $V_2 = i_4R_2 + i_5R_3 = q_3/C_3$ $i_3 + i_4 = -d(q_3 - q_4)/dt$ $i_3 = G_2V^{3/2}\ (V_2 > 0)$ (*)

$i_3 = 0\ (V_2 \leqq 0)$ (*)

$V_2 - V_5 = i_4R_4$

The following six second order non-linear ordinary differential equations can be obtained from the above eighteen equations.

$X = \omega t$ $d^2V/dx^2 = 1/C_6L\omega^2 \cdot (-L/R_L \cdot dV/dX - V + V_5)$ $dV_5/dx = (V_1/R_1 + V_2/R_2 - (1/R_1 + 1/R_2 + 1/R_3) \cdot$
$V_5 - V/R_L)/(C_5 - C_6/C_5 \cdot dV/dx$ $dV_1/dx = (-C_2\omega \cdot V_o \sin x - G_1V_1^{1.5} - (V_1 - V_5)/R_1)/$
$(C_1\omega + C_2\omega)$ (at $V_1 > 0$)

$dV_1/dx = (-C_2\omega \cdot V_o \sin x - (V_1 - V_5)/R_1)/(C_1\omega + C_2\omega)$
(at $V_1 \leqq 0$)

$dV_2/dx = (C_4\omega \cdot V_o \sin x - G_2V_2^{1.5} - (V_2 - V_5)/R_2)/$
$(C_3\omega + C_3\omega)$ (at $V_2 > 0$)

$dC_2/dx = (C_4\omega \cdot V_o \sin x - (V_2 - V_5)/R_2)/(C_3\omega + C_3\omega)$
(at $V_2 \leqq 0$)

FIG. 7 shows the rectifying performance with a non-linearity of about 1/300 obtained by solving the above six differential equations. This owes to the non-linear equations (**) which originate from the non-linear rectifying characteristics (*) of the diode. Hitherto available rectifying circuit typically shows such a non-linearity. Hence, by comparing it with a linear scanning voltage waveform as shown in FIG. 8, the RF voltage V is so controlled as to become lower than the value to which it should be justly controlled at the corresponding U voltage at (A) and (C) regions. To the contrary, in region (B), the RF voltage V is so controlled as to become higher than the value to which it should be justly controlled. Thus, the controlled U/V ratio is greater than the desired value to which it should be adjusted in region (A), smaller than the desired value in region (B) and again greater than the desired value in region (C). This fact is due to feed back loop which operates to make the RF voltage V so as the rectified voltage $V_{rect}$ to become equal to $V_{ref}$ and DC voltage is produced linear to $V_{ref}$.

In region (A) an excessively high resolution will be given rise to or the peaks will partly disappear.

In region (B), the resolution for mass separation becomes excessively low, while the peaks of the mass spectrum are high, to make the quantification unreliable. In addition to a similar problem of an excessively high resolution and low peaks that arises to adversely affect the quantification in area (C), peaks can totally disappear on large mass numbers. More often than not, a polygonal line is used for the scanning voltage waveform or the rectifying voltage waveform is stored in a ROM in order to alleviate the above problems with known prior art methods, although such techniques cannot provide a satisfactory resolution for mass spectrometry and additional problems may arise particularly when the duplex diode of the rectifying circuit is replaced.

Therefore, it is an object of the present invention to provide a method of controlling a quadrupole mass spectrometer of the type under consideration by using a so-called O-method to achieve a uniform resolution over a wide range of mass numbers that is not affected by the non-linearity and temperature dependency of the related devices. Another object of the present invention is to provide an all-solid-state type control circuit device designed to carry out such a control method.

SUMMARY OF THE INVENTION

According to an aspect of the present invention, the above first object is achieved by providing a method of controlling a quadrupole mass spectrometer comprising two pairs of hyperboloidal columns or cylindrical rods arranged in vacuum, the rods of each pair being disposed accurately in parallel with each other, a voltage of U+Vcosω t obtained by superimposing an RF voltage on a DC voltage being applied to one of the pairs of rods, another voltage of —U−Vcosω t being applied to the other pair of rods, ions of gaseous substances and/or evaporated solid substances to be analyzed being focussed to the central portion of the entrance of the quadrupole section, Mathieu's differential equation being used for the equations of motion for ions employing x- and y-coordinates running perpendicular to the center axis of ions moving inside the quadrupole section, ions having a specific ratio of the mass number to the electric charge being made to pass through the quadrupole section by selecting appropriate values for U and V so as to make parameters a and q of the equations stay in the first or second quadrant of the coordinate system or changing the values of U and V so as to make them pass through part of the first or second quadrant in order to mass analyse the ions or obtain a mass spectrum, wherein the peak value V of the RF voltage and the DC voltage are precisely controlled by directly comparing the positive or negative peak value U+V or U−V of the voltage U+Vcosω t being applied to the rods of one of the pairs or the negative or positive peak value —U−V or —U+V of the voltage —U−Vcosω t being applied to the rods of the other pair with a reference voltage to be precisely controlled and feeding back the difference to the modulation circuit of the RF amplifier for generating the RF voltage to minimize the difference and that the voltages U and —U are generated on the basis of the reference voltage and the controlled RF voltage is overlaid on a DC voltage to produce precisely controlled voltages U+Vcosω t and —U−Vcosω t to be applied to the respective pairs of rods.

According to another aspect of the present invention, an all-solid-state control circuit is provided for carrying out the present zero method. The control circuit comprises four means, namely means for producing RF voltage to be applied to the rod pairs of the quadrupole mass spectrometer, a DC voltage generator for generating a DC voltage to be superimposed to the RF voltage, a reference voltage generator for producing $U_o$-$V_o$ etc. and a scanning voltage generator. The key point of the control circuit is to provide a comparison circuit which is intended to detect the difference between the peak of (RF+DC) voltage given to the pairs of rods and the reference voltage, selectively amplify the DC component included in the error signal, feed back it to a balancing modulator circuit so as to make the error signal to very small values and produce right RF voltage.

The comparison circuit may comprise a high speed solid diode with small reverse current, a reverse withstand voltage far greater than 2V and a short reverse recovery time and a signal resistor for generating an error signal voltage. The (RF+DC) voltage supplied to the quadrupole section is fed to one terminal of the signal resister and the other terminal of the resister is supplied with the reference voltage. Between the two terminals comparison signal is generated, namely small (RF+DC) signal voltage which corresponds to the top part of the quadrupole wave form over the reference voltage and the negative reverse current induced in the diode by another half cycle of RF voltage. As will be shown hereinafter the DC signal voltage is produced by unbalancing of the top part of the (RF+DC) wave form over reference voltage and the negative cycle caused by reverse current induced in the diode. Then, the DC signal voltage is selectively amplified by a combination of a low pass filter and an operational amplifier which has the sufficient gain from DC to 1 kHz (typically 70 dB) and small gain (typically −40 dB) at RF frequency of the RF voltage given to the quadrupole section. Then the amplified voltage is transmitted to the floor level by the isolation amplifier, amplified by one direction DC operational amplifier stage and finally fed back to the double balanced mixer which constitutes the balancing amplifier stage of the RF generator. Thus, right RF voltage is produced and fed to the quadrupole section.

In the alternative configuration of control circuit device, the RF voltage pick up circuit preferably may comprise an attenuator formed by connecting a resistor and a capacitor in parallel to show a constant split ratio over the entire frequency range including DC.

DETAILED DESCRIPTION OF THE PREFERRED EMBODIMENT

Figure 1A:
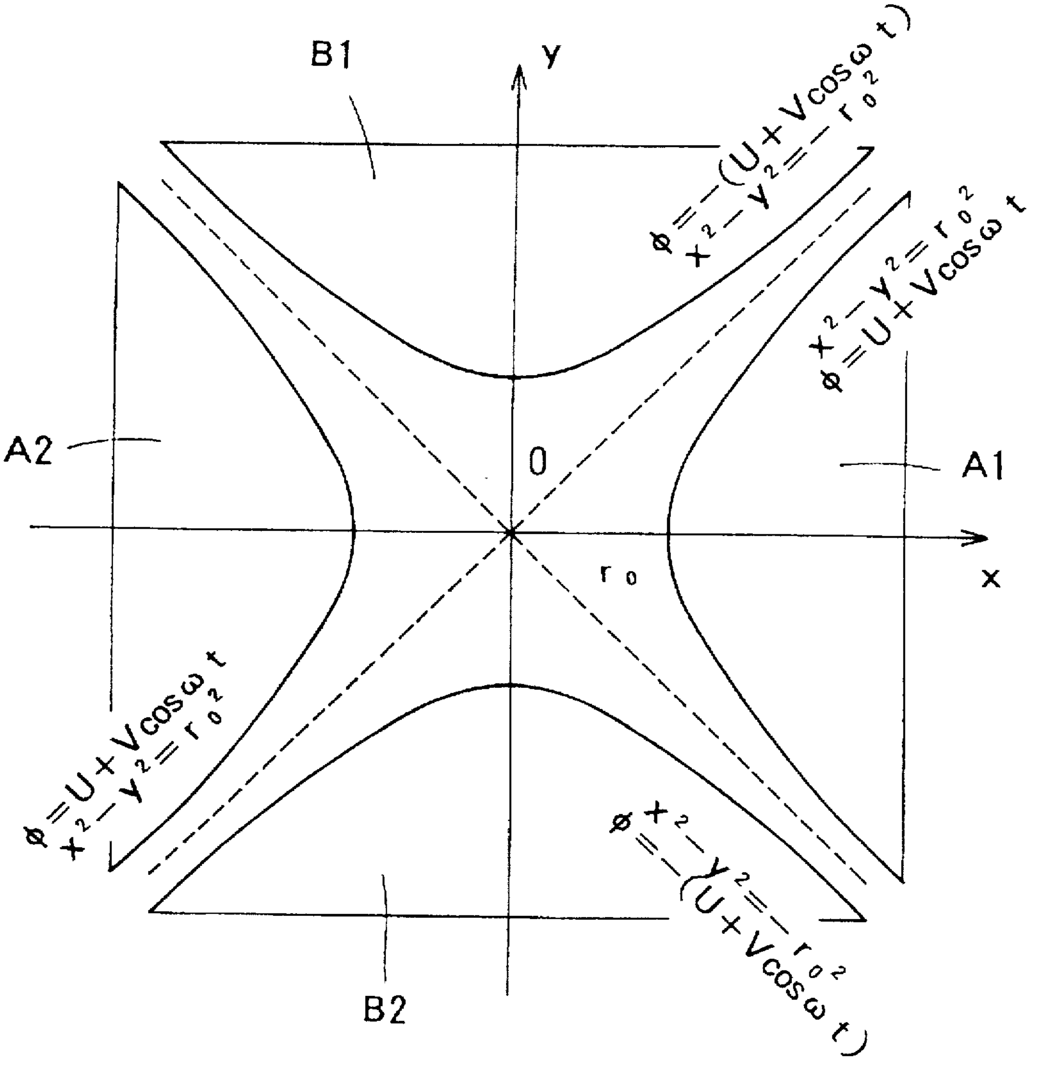
FIG. 1A is a schematic sectional view of the quadrupole section of a quadrupole mass spectrometer to which the present invention is applicable.
Figure 1B:
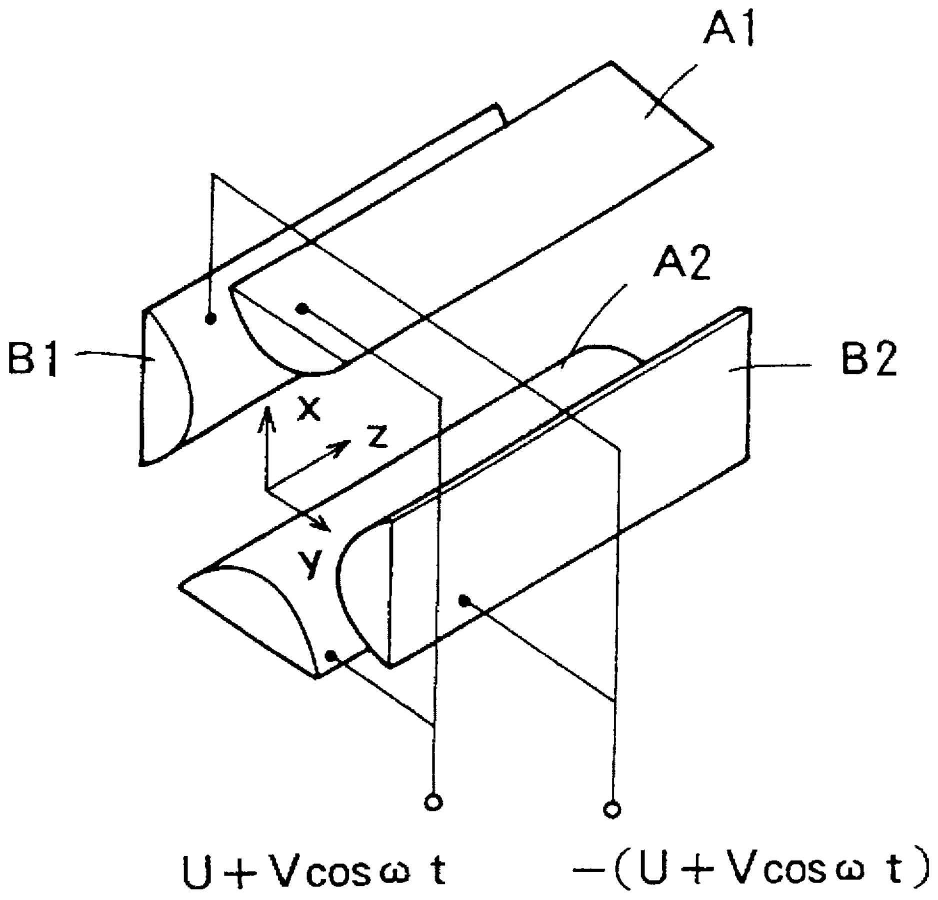
FIG. 1B is a schematic perspective view of the quadrupole section of FIG. 1A.
Figure 2:
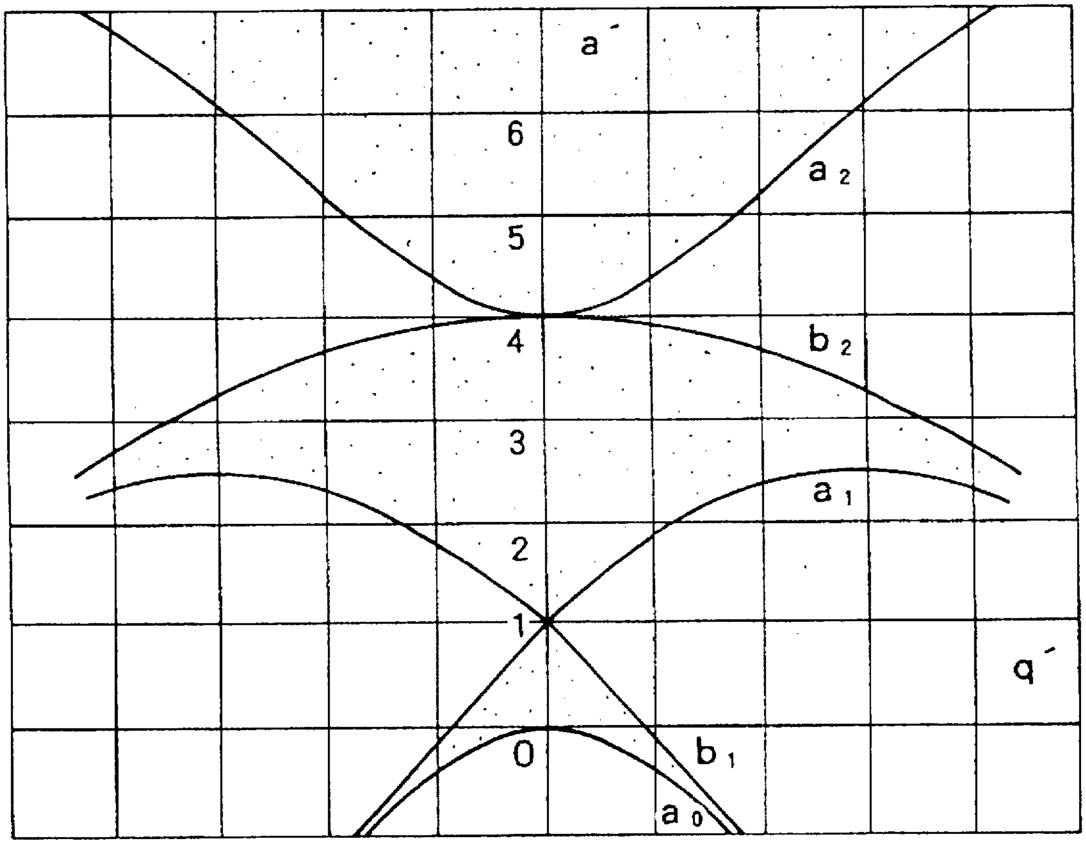
FIG. 2 is a graph showing the stable regions of Mathieu's differential equation.
Figure 3:
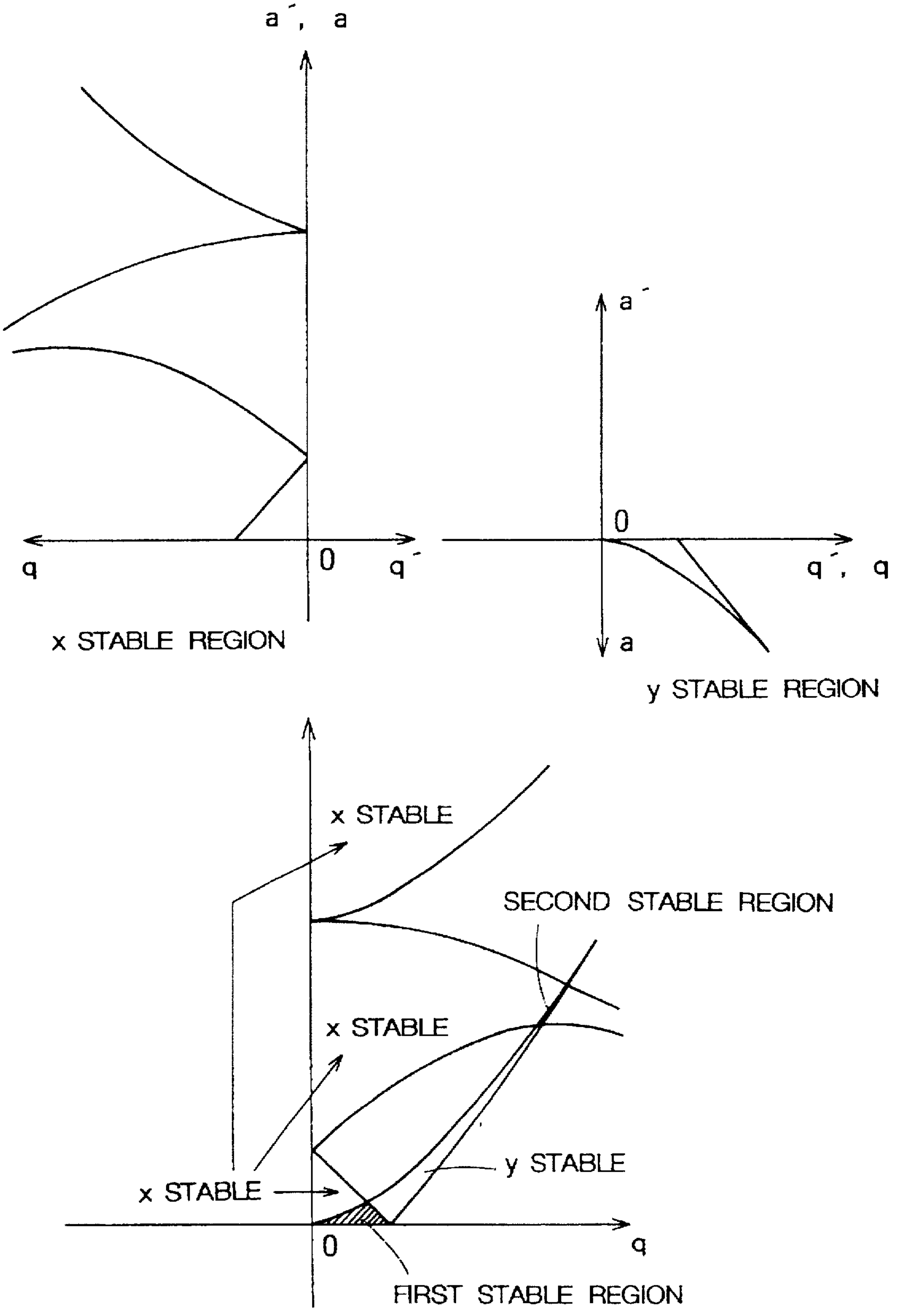
FIG. 3 is a graph showing the stable regions of a quadrupole mass spectrometer to which the present invention is applicable.
Figure 4A:
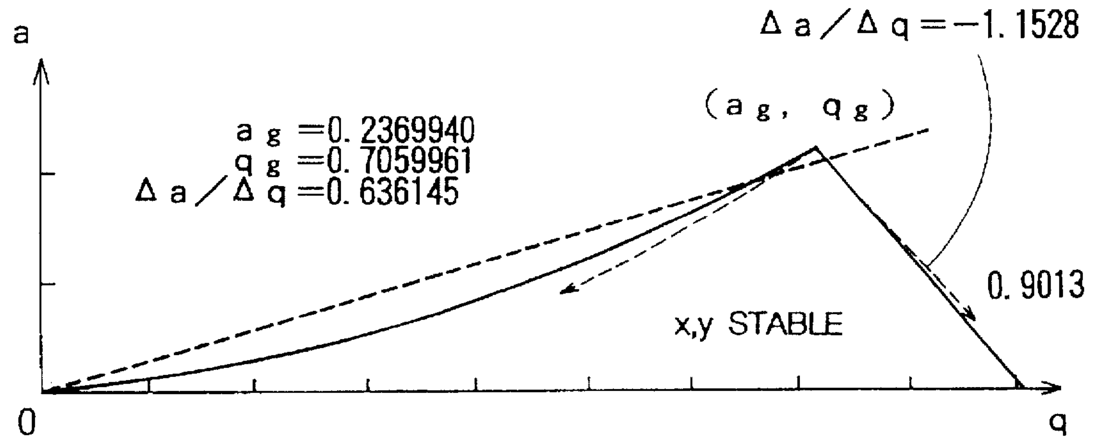
FIG. 4A is a graph showing the first stable region on the a and q diagram.
Figure 4B:
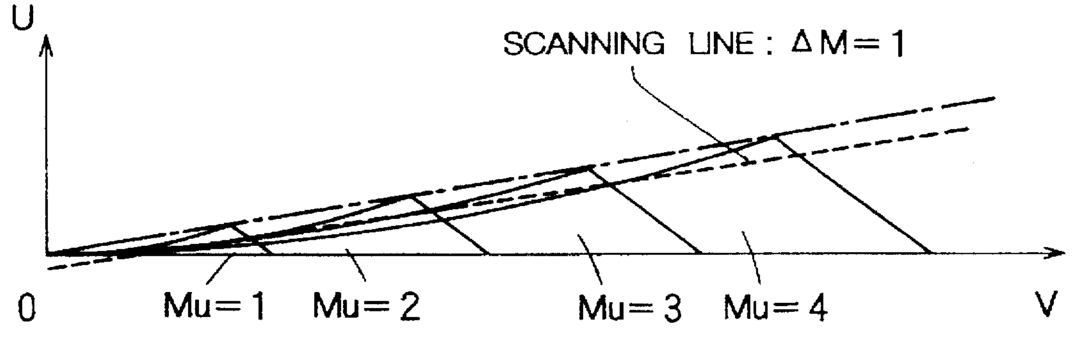
FIG. 4B is a graph showing the first stable region on the U and V diagram.
Figure 5:
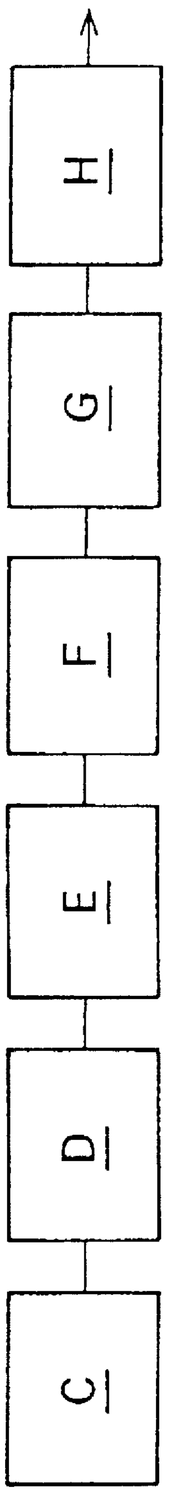
FIG. 5 is a block diagram of a conventional control circuit to be used for a quadrupole mass spectrometer.
Figure 6:
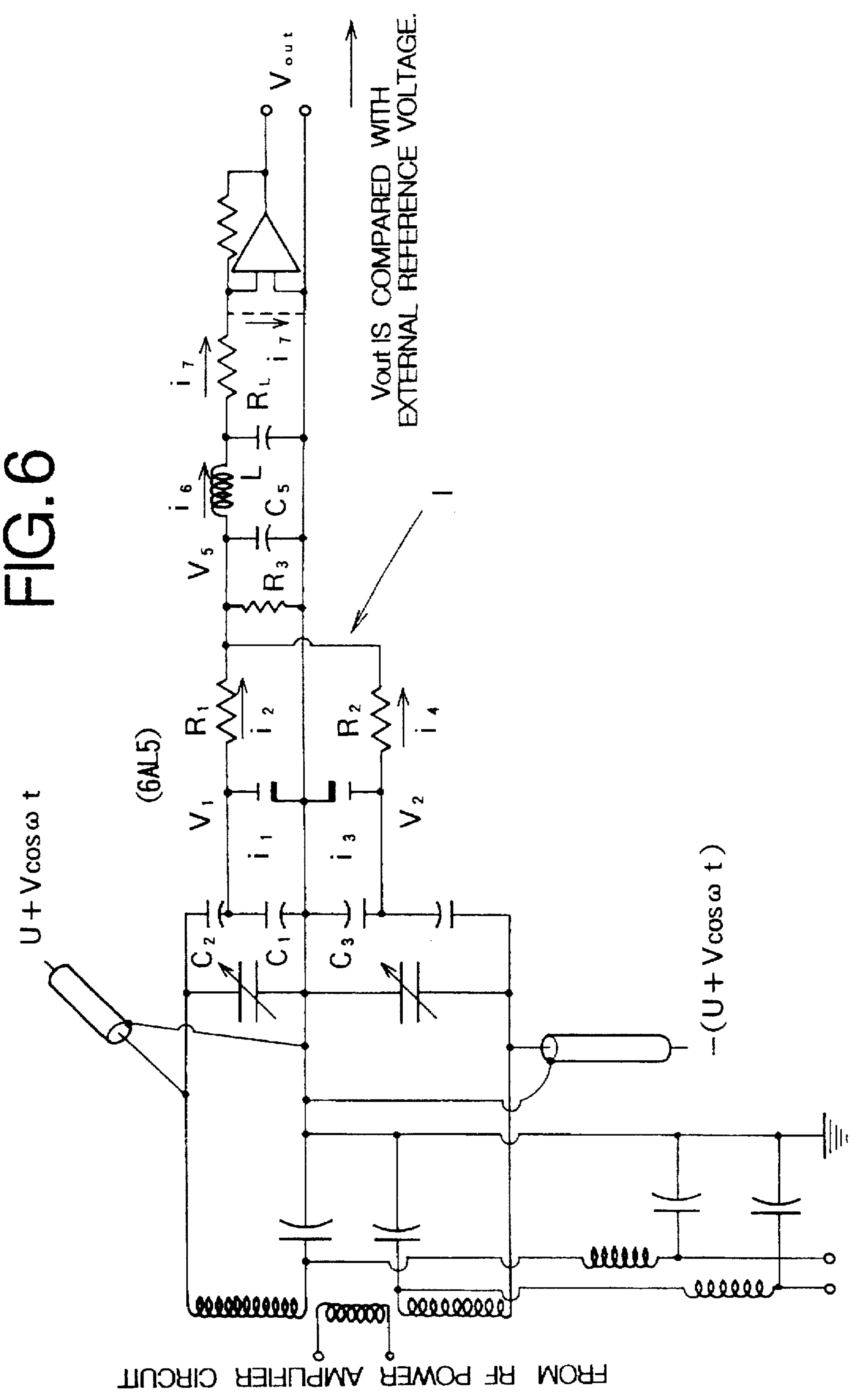
FIG. 6 is a circuit diagram of a principal portion of the control circuit of FIG. 5.
Figure 7:
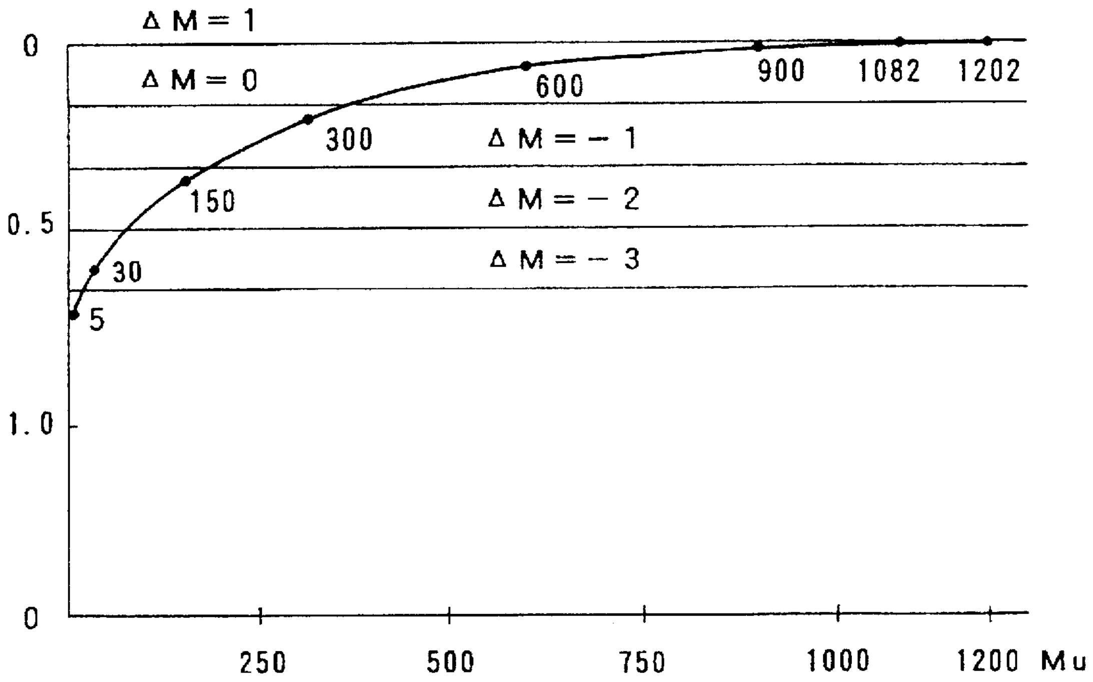
FIG. 7 is a graph showing the operation of the known control circuit of FIGS. 5 and 6.
Figure 8:
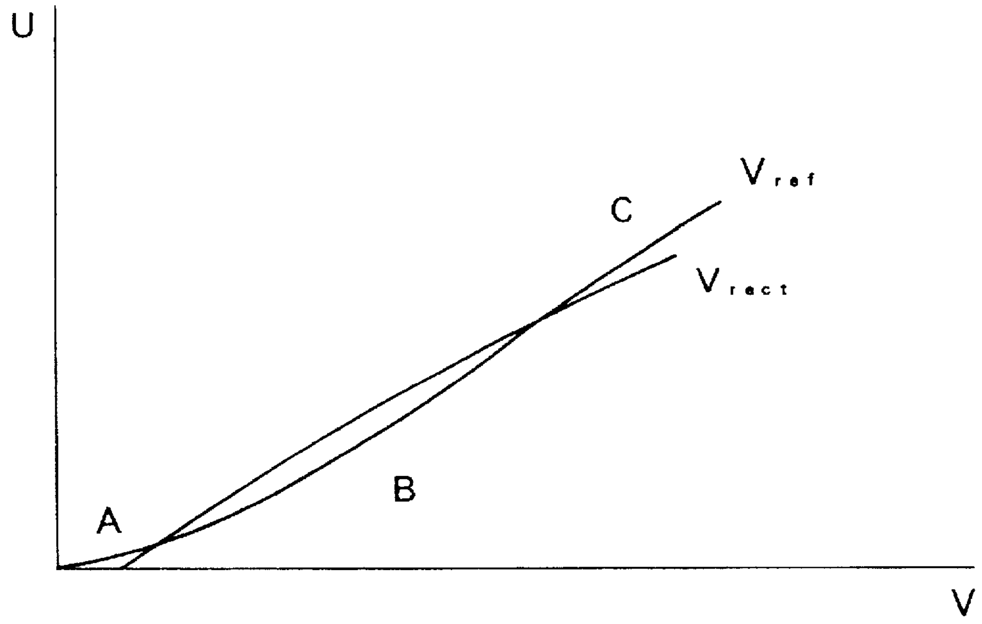
FIG. 8 is a graph showing the operation of the known control circuit of FIGS. 5 and 6.
Figure 9:
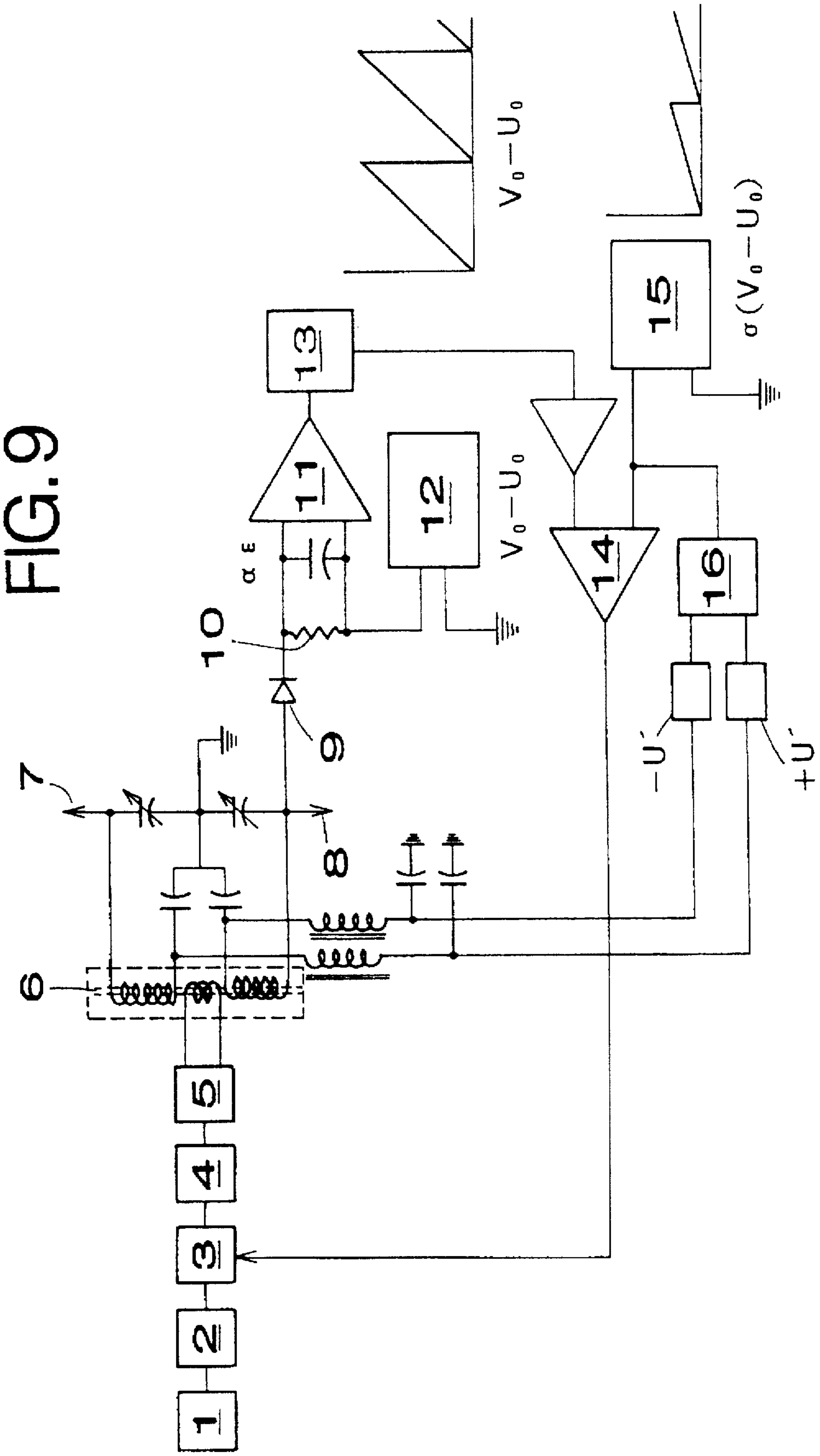
FIG. 9 is a block circuit diagram of an embodiment of control circuit device according to the invention that can be used for a quadrupole mass spectrometer.

FIG. 9 is a block circuit diagram of an embodiment of control circuit device according to the invention that can be used for a quadrupole mass spectrometer.

Referring to FIG. 9, there is shown a high frequency amplifier circuit for generating a RF voltage comprised of a crystal oscillator 1, a buffer amplifier 2, a balanced amplifier 3, a RF voltage amplifier 4 and a RF power amplifier 5. Otherwise, there are shown a RF transformer 6, output terminals 7 and 8 connected to the respective rods of a quadrupole mass spectrometer, a high speed diode 9 with a small reverse current, a reverse withstand voltage greater than 2V and short reverse recovery time (typically 35 nsec), a resistor 10 for generating an error signal voltage, a low frequency amplifier 11, a first reference voltage generating circuit 12, an isolation amplifier 13, a differential amplifier 14 forming a feedback circuit, a second reference voltage generating circuit 15 and a DC voltage generating circuit 16. These components are connected in the illustrated manner. In this embodiment, the positive peak value of —U−Vcosω t is compared with calibration voltage $V_o$-$U_o$ for the controlling operation.

Figure 10:
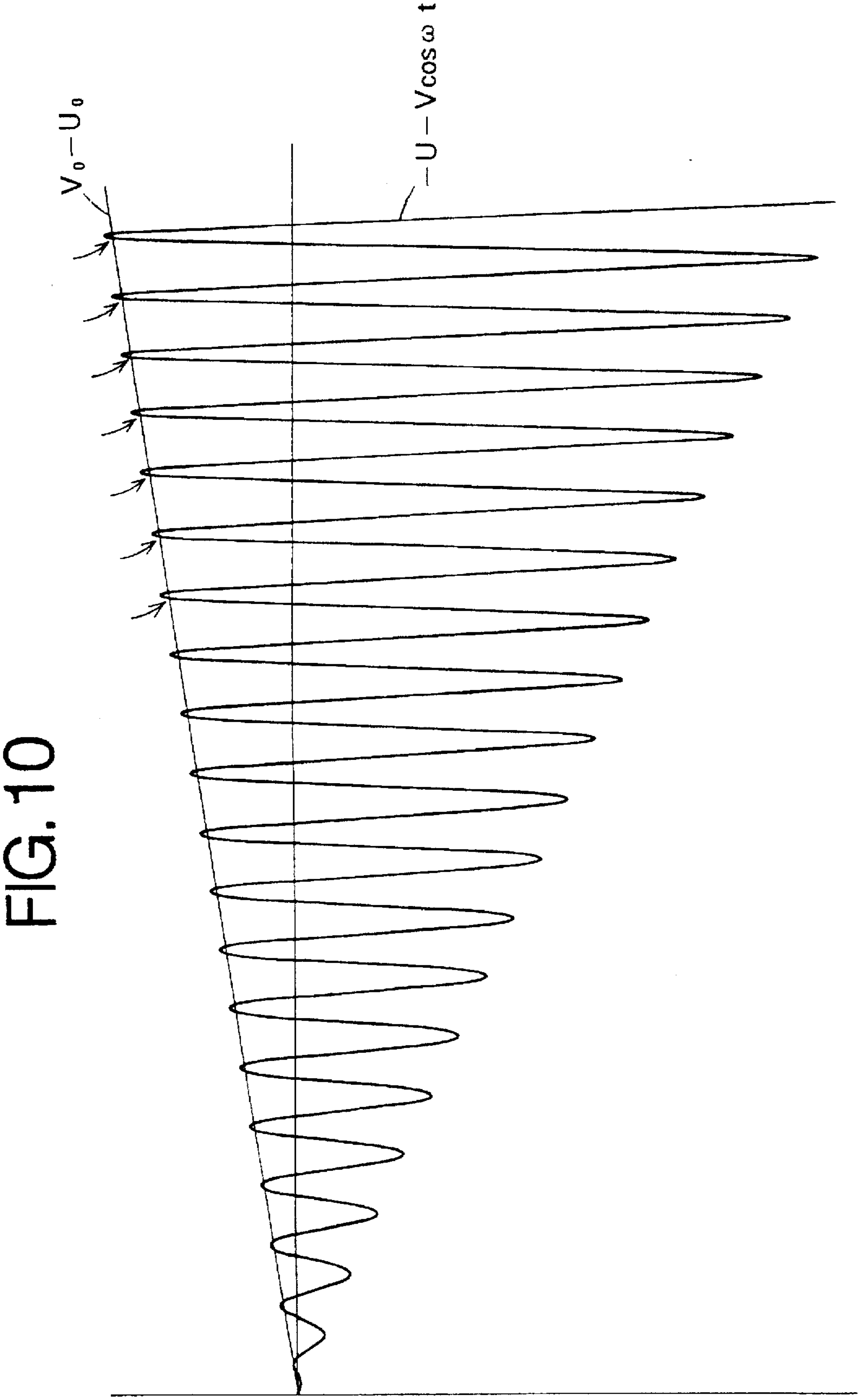
FIG. 10 is a graph showing the operation of the circuit including a high speed diode and a resistor for generating an error signal voltage of the circuit device of FIG. 9.
Figure 11:
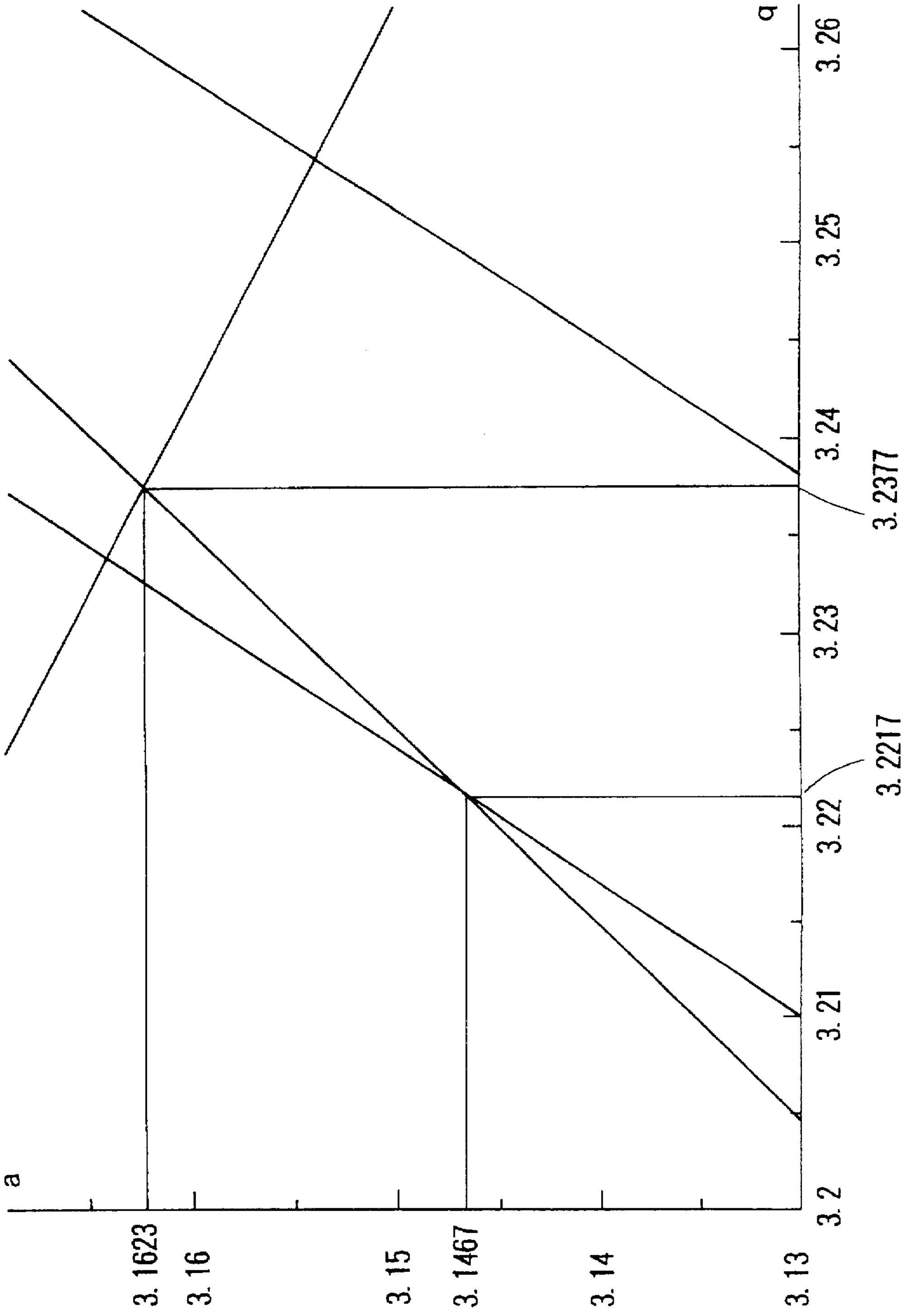
FIG. 11 is a graph showing the scan line crossing left corner of the second stable region.
Figure 12:
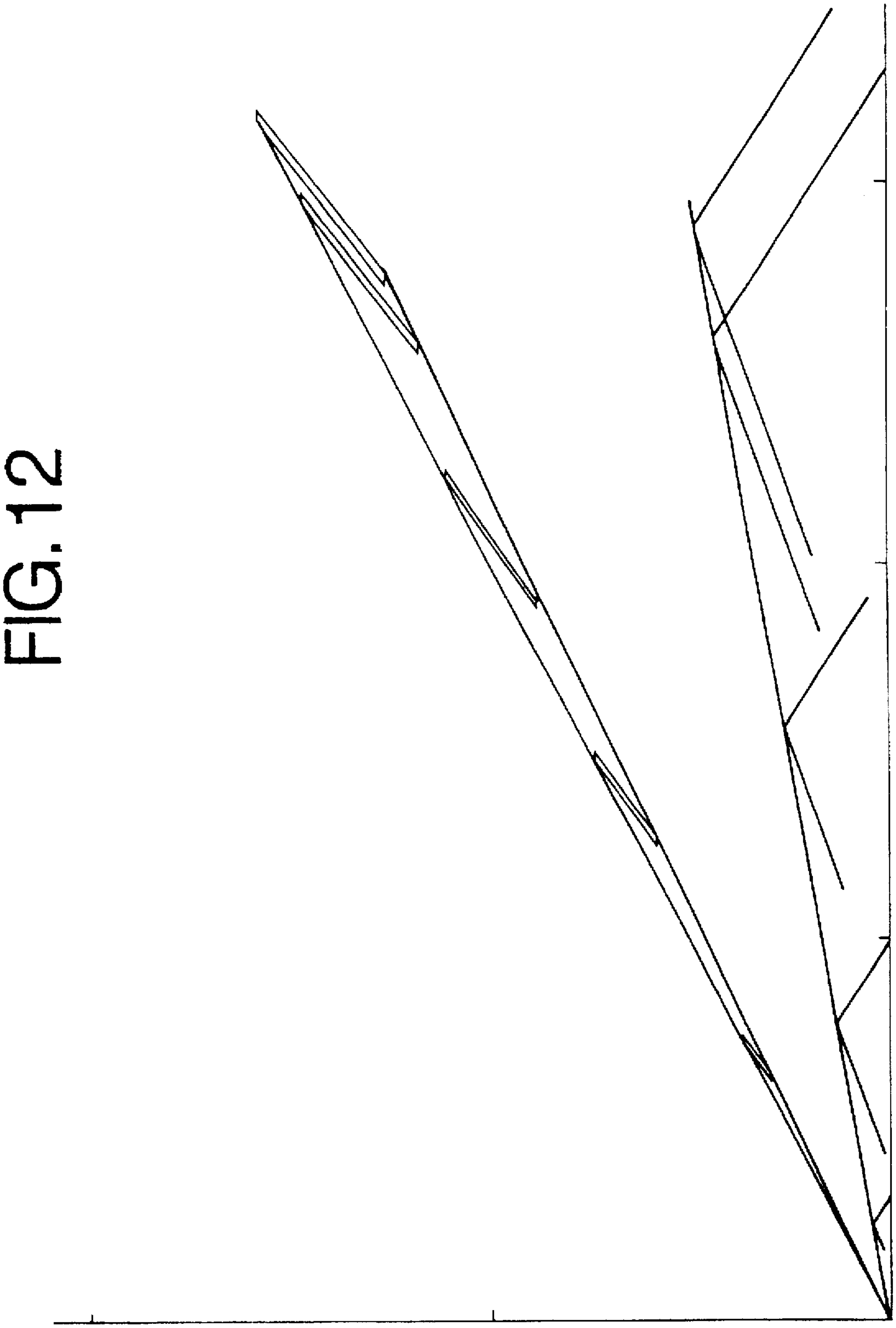
FIG. 12 is a graph showing the relationship of the first and second stable regions and the scanning line of a quadrupole mass spectrometer whose operation is controlled by a method according to the present invention in U—V diagram.

FIGS. 10 through 12 are for a scanning line passing through the left upper corner of the second stable region. Peak values located close to ωt=(2n+1)π for —U−Vcosω t and slightly exceeding (by 10 to 40 mV) the calibration voltage $V_o$-$U_o$ generated by the first reference voltage generating circuit 12 to produce a sawtooth wave are detected by the circuit of a high speed diode 9 having a high reverse withstand voltage and a resistor 10 for generating an error signal.

Figure 13:
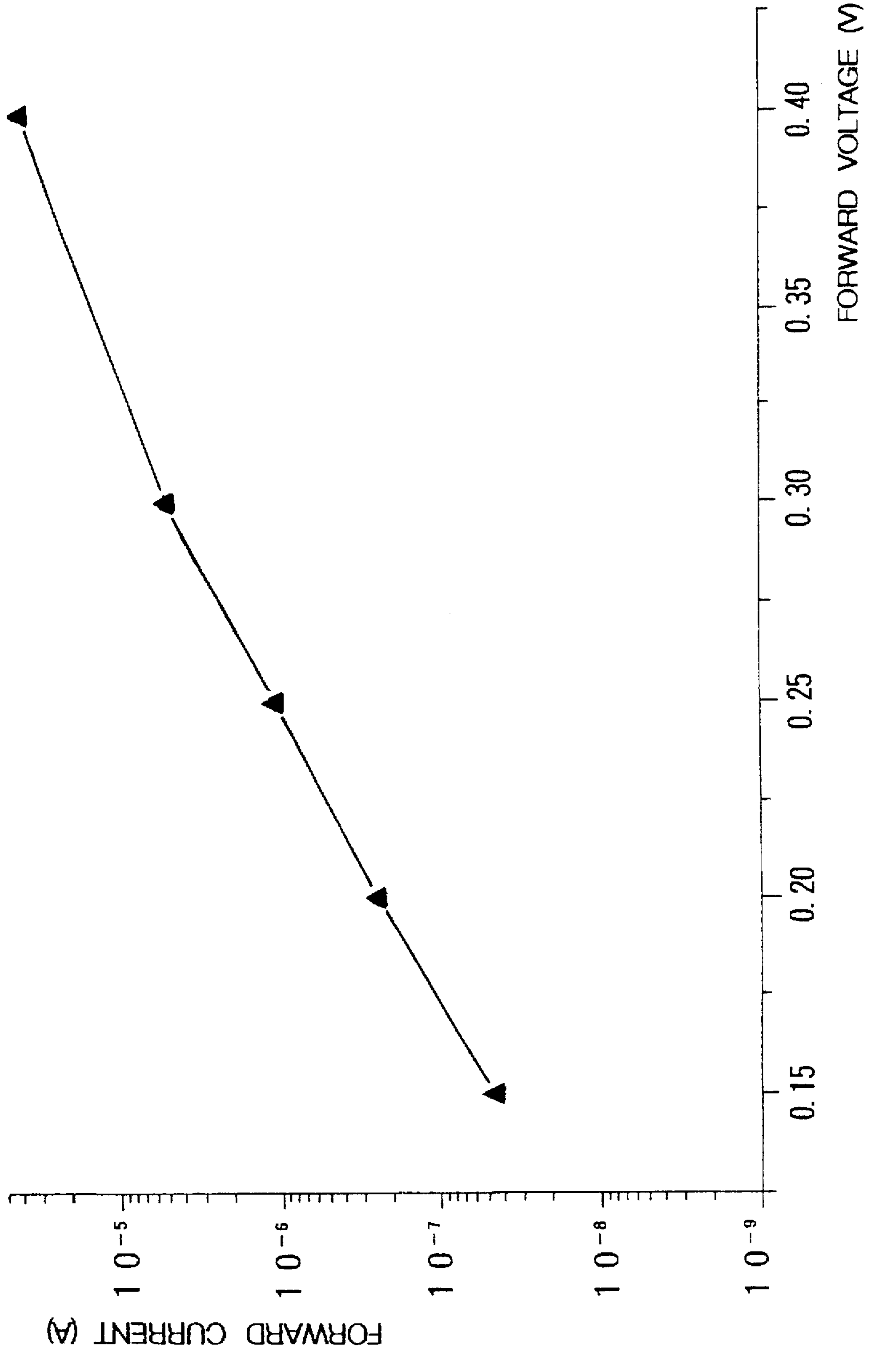
FIG. 13 is a graph showing the forward characteristics of a high speed diode that can be used for the circuit device of FIG. 9.
Figure 14:
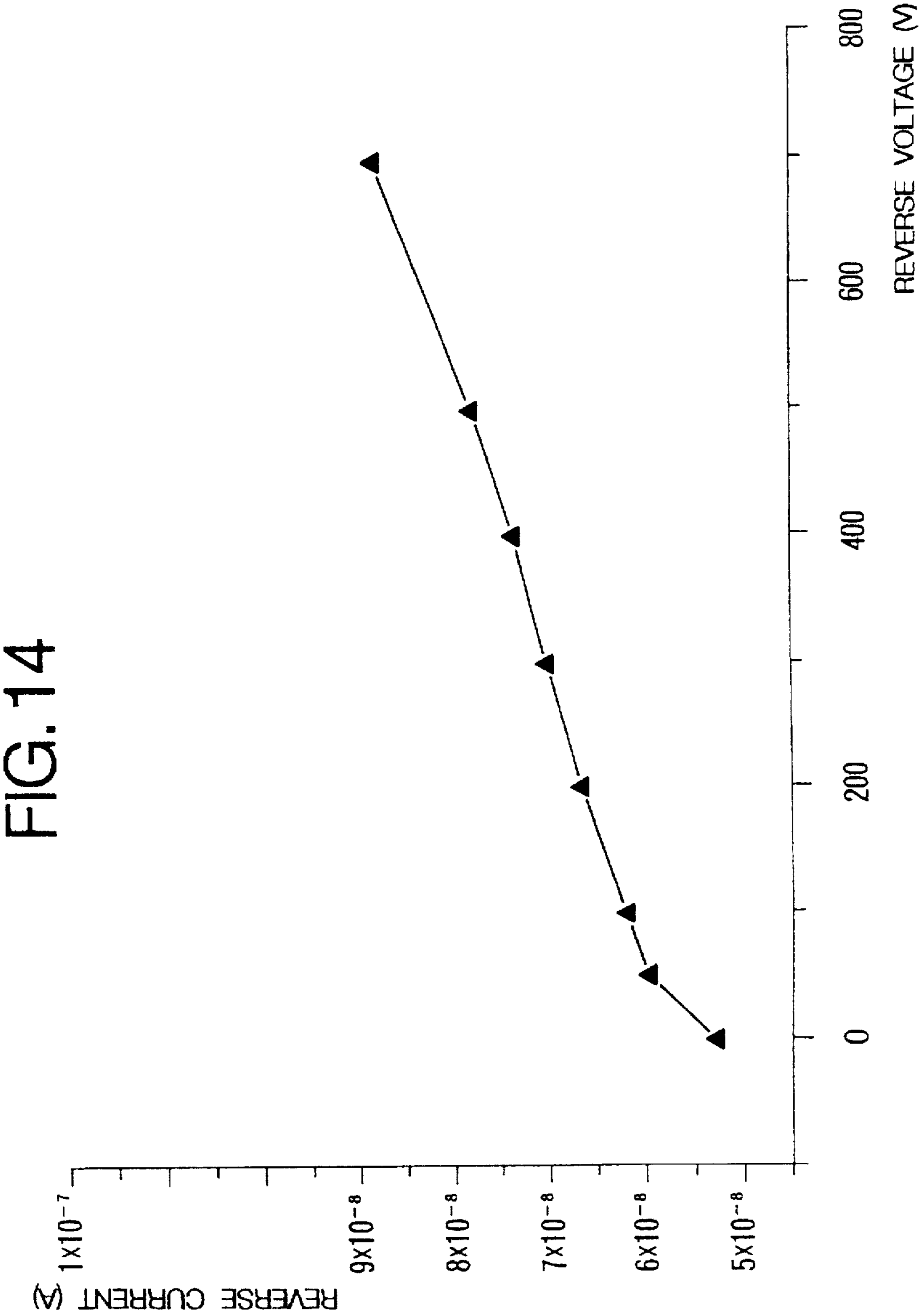
FIG. 14 is a graph showing the backward characteristics of a high speed diode that can be used for the circuit device of FIG. 9.

FIGS. 13 and 14 respectively show the relationship between the forward current and the forward voltage and the relationship between the backward current and the backward voltage of a commercially available diode that can be used for the diode 9. The reverse recovery time is typically 35 nanoseconds. If the peak reverse current is 0.1 μA, the reverse recovery current will be $1.75\times10^{-8}$ A at most for 5 MHz. The reverse recovery current is a current generated as follows. In the forward cycle, minor carrier electrons are injected into the P-type region while minor carrier holes are injected into the N-type region, and they returns respectively to the N-type and P-type regions in the reverse cycle of backward pulses through the junctioning plane. The peak value of the reverse return current will be small when only a low voltage of 40 mV is forwardly applied because the number of injected carriers is very small.

The static forward and backward current of an ideal PN junction diode is expressed by the formula below before a Zener current appears.

$$I—Is\ (\exp\ (\eta\ eV/kT)-1)$$

where η is a value not greater than 1.0.

For example, a commercially available high reverse withstand voltage diode produces a backward current of $8.4\times10^{-8}$ A at 600 V and a forward current of $1\times10^{-7}$ A at 0.154 V. Thus, an electric current of $8.25\times10^{-9}$ A+$9.175\times10^{-8}$ A×cosω t having a DC component and an RF component will flow through the resistor 10 for generating an error voltage signal when a peak "pops up" forwardly by 0.154 V above the reference voltage and a voltage of 600 V is backwardly applied by adding the RF and DC voltages.

On the other hand, an electric current of $8.4\times10^{-8}$ A×cosω t having only an RF component will flow through the resistor 10 for generating an error voltage signal when a peak "pops up" forwardly by 0.153 V above the reference voltage and a voltage of 600 V is backwardly applied by adding the RF and DC voltages. In other words, assuming a forward voltage of $\delta V_{offset}$ (0.153 V in the above example) that generates a forward current equivalent to the reverse current generated by a reverse voltage of −600 V, the DC component of the electric current flowing through the resistor 10 for generating a signal current will be $8.25\times10^{-9}$ A×ε×1,000 if a voltage of ε (V) is added thereto, as the difference of 0.154 V and 0.153 V is 1/1000 volt.

The generated voltage is then fed back to and amplified by the operational amplifier comprising a low frequency amplifier to produce 50 dB from DC to 1 kHz and −40 dB at 5 MHz. Therefore, a DC error signal of 4.125 mV×100ε=0.4125ε V is generated when 500 kΩ is used for the resistor 10 for generating an error voltage signal, which signal is then tranmitted by the isolation amplifier 13 with voltage gain of unity to floor level and amplified by an operational amplifier and fed to the differential amplifier 14, which compares the signal fed from the operational amplifier mentioned above with a second reference voltage fed from the second reference voltage generating circuit that attenuates the calibration voltage by a factor of 1/30 and feeds the difference back to the double balanced mixer of the balanced amplifier of the RF amplifier circuit that acts as a multiplier of the voltage from the crystal oscillator 1.

Now, the controllable level of RF voltage will be determined by calculation.

The signal generated by the resistor 10 for generating an error voltage signal in FIG. 9 is expressed by $$Vsig=4.125\omega V+45.875\times\cos\omega\ t\ V$$

and the output of the isolation amplifier 13 is expressed by $$0.4125\omega V+0.46\times10^{-3}\cos\omega\ t\ V.$$

The output is then amplified by 20 dB and compared with the second reference voltage obtained by attenuating the calibration voltage by a factor of 1/30.

Assuming, as before, a forward voltage of dVoffset that generates a forward current equivalent to the reverse current generated by a reverse voltage of −600 and the feedback is balanced when the forward voltage is raised by e and also assuming a reference voltage of $r(V_o$-$U_o)$ supplied by the second reference voltage generating circuit, then the DC voltage to be applied to the IF terminal of the double balanced mixer of the balanced amplifier 3 of FIG. 9 will be expressed by $$\sigma\ (V_oU_o)+\delta V_{offset}-\alpha\epsilon\mu_{sig}$$

where $$\sigma=8.25\times10^{-9}A\times500\ k\Omega,$$

and $$\mu_{sig}=100\times10=1000$$

in the above example.

Note that $(V_o$-$U_o)$=0.5118 $V_o$ is obtained for the spot at the upper left corner of the second stable region where the resolution is 1/200, if the inner diameter of the quadrupole section is 3 mm.

Figure 15:
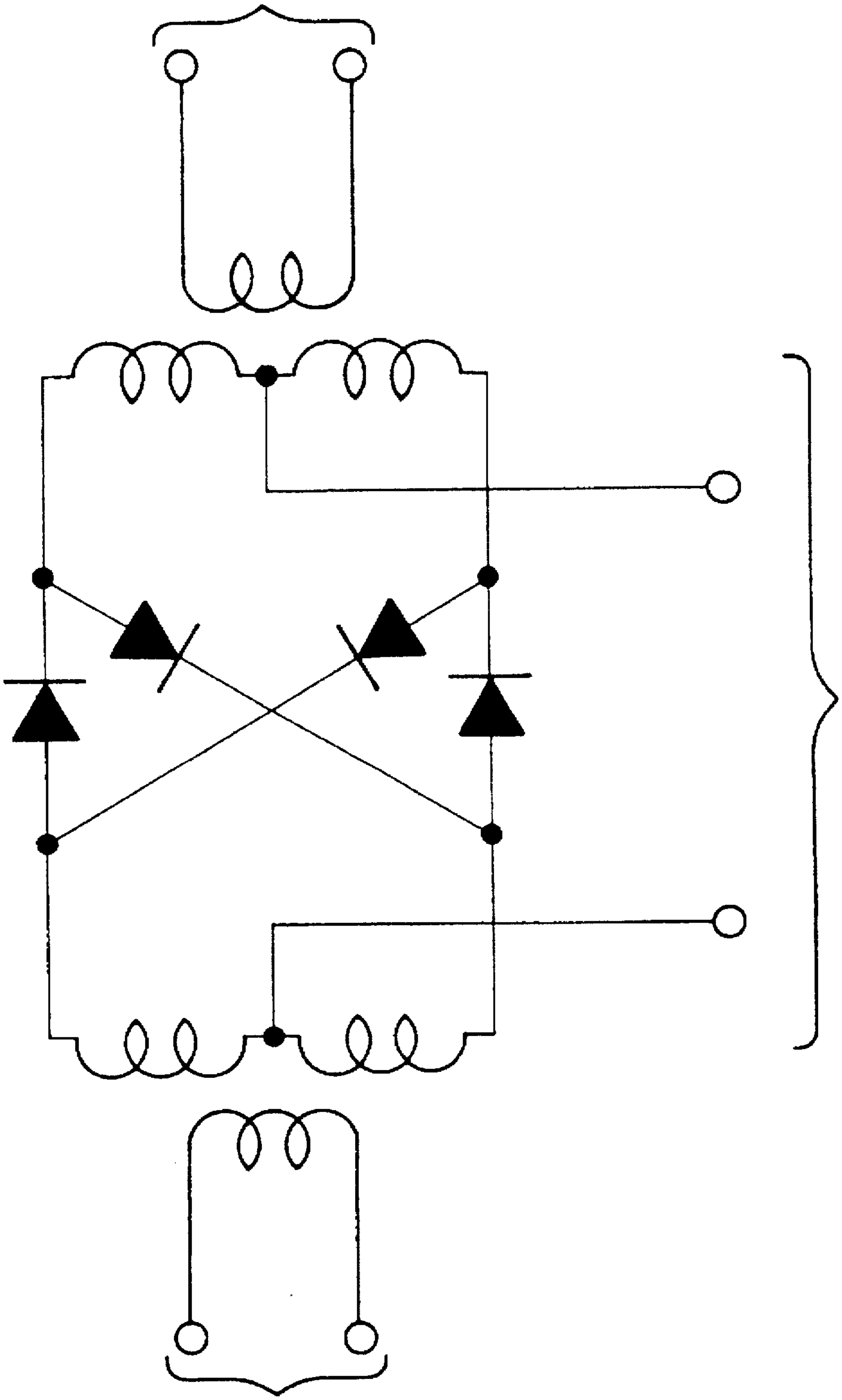
FIG. 15 is a circuit diagram of the double balanced mixer which constitutes the balancing modulator of the RF amplifier circuit of the circuit device of FIG. 9.
Figure 16:
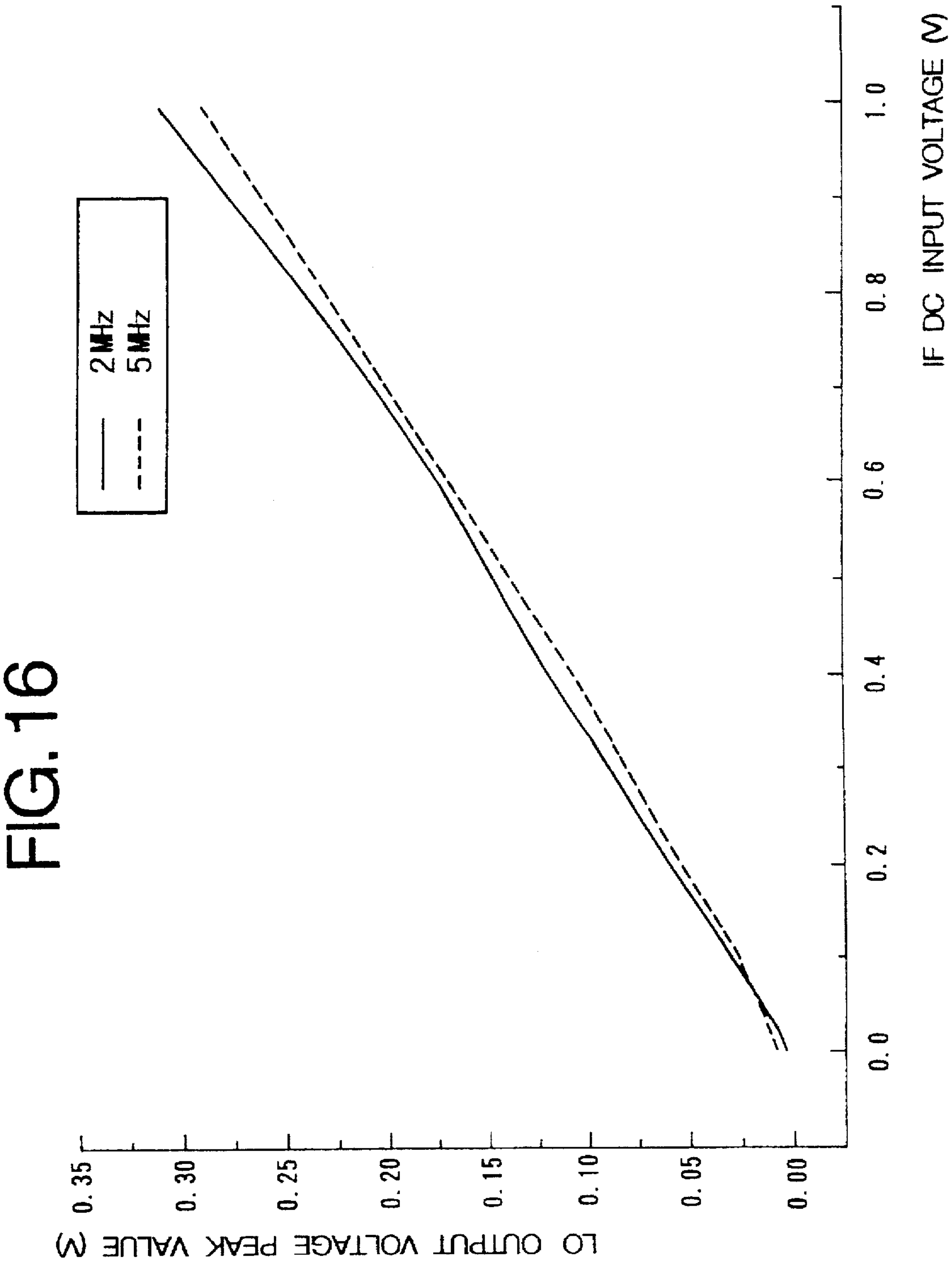
FIG. 16 is a graph showing the relationship between the output voltage peak value and the DC input voltage of the double balanced mixer of the RF amplifier circuit of FIG. 9.

FIG. 15 is a circuit diagram of the double balanced mixer of the high frequency amplifier circuit of the circuit device of FIG. 9, and FIG. 16 is a graph showing the relationship between the output voltage peak value and the DC input voltage applied to IF terminal. Note that the output contains the third harmonic having an amplitude equal to one third of that of the fundamental wave. As seen from FIG. 15, the double balanced mixer operates as a multiplier circuit. Therefore, if an input voltage of A+Δ A (Δ A being the variation of the amplitude of the crystal oscillator 1) is applied to the double balanced mixer 3 by the crystal oscillator 1 and a modulated DC voltage of $V_{IF}$ is applied to the IF terminal, an output voltage of $$\lambda' (A+\Delta A)' V_{IF}$$

is produced on the output side of the double balanced mixer.

From FIG. 16, the following value is obtained.

$$\lambda = 3/4' \text{ Volt}^{-1}$$

When the RF output voltage obtained by multiplying the output of the double balanced mixer 3 by μ produces a balanced condition, the following equation holds.

$$\lambda' (A+\Delta A)'(0.5118'\sigma' V_o + \delta V_{offset} - \alpha\mu_{sig}\epsilon)'\mu = V_o + \epsilon \quad (6)$$

From the above equation for the feedback loop and if $$\epsilon = \frac{(\lambda(A+\Delta A)\cdot(0.5118\sigma V_o + \delta V_{offset})\mu - 1)V_o}{\lambda(A+\Delta A)\alpha\mu_{sig}\mu + 1}$$

$A + \Delta A \sim 0.5V$, $\sigma = 0.0325$, $\mu = 10000$ $\alpha = 412.5$, and $\mu_{sig} = 1000$, then the equation below is obtained.

$$\epsilon = \frac{0.5118\sigma V_o + \delta V_{offset}}{\alpha\mu_{sig}} \quad (7)$$

$$= 4.03 \times 10^{-6} V_o + 2.4 \times 10^{-4} \delta V_{offset}$$

In the above equation, the first and second terms are about 1.2 mV and 0.03 mV respectively. In other words, the RF voltage can be controlled with an accuracy level of $4\times10^{-6}$ of that of the reference voltage to be controlled.

Additionally, the U voltage can be controlled with an accuracy level of $10^{-5}$ of that of the reference voltage to be controlled because the former is a DC voltage or has a sawtooth waveform.

While the positive peak value of —U–Vcosmt of the voltages to be applied to the quadrupole mass spectrometer is compared for calibration in the above embodiment, the negative peak value may alternatively be compared with a negative calibration voltage of $—U_o$-$V_o$. Then, the polarity of the calibration diode and that of the error signal amplifier will have to be inverted.

Alternatively, the positive or negative peak value of the voltage U+Vcosω t to be applied to the other pair of electrodes of the quadrupole mass spectrometer may be compared with $U_o$+$V_o$ or $U_o$-$V_o$ for calibration and control. Note that the above polarity arrangement is used when the positive peak value is used for calibration and control, whereas the polarity of the calibration diode and that of the error signal amplifier have to be changed when the negative peak value is used.

Figure 17:
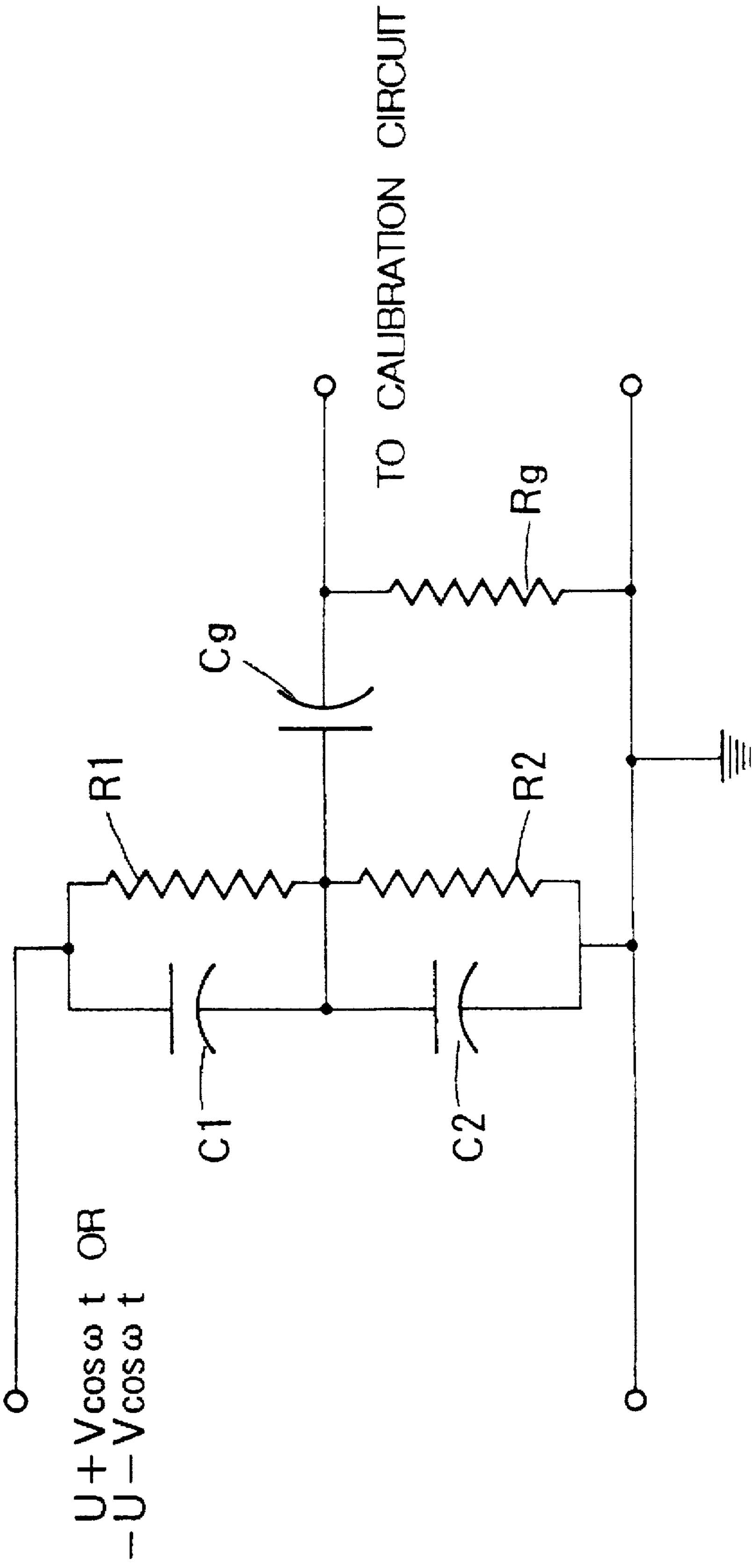
FIG. 17 is a circuit diagram of an attenuator circuit that can be used for the circuit device of FIG. 9.

FIG. 17 is a circuit diagram of an attenuator circuit that can be used for the circuit device of FIG. 9. By using such an attenuator, the voltage U+Vcosω t to be applied to the quadrupole mass spectrometer can be precisely attenuated without damaging the waveform. The attenuator is comprised of a resistor R1 and a capacitance C1 connected in parallel and a resistor R2 and a capacitance C2 also connected in parallel and the capacitances C1 and C2 are so selected as to hold the relationship of C1'R1 =C2'R2. Such an arrangement can precisely attenuate the voltage applied thereto without damaging the waveform of the voltage. For instance, an arbitrarily selected Fourier component v-cosω t of an arbitrarily given waveform is divided to reflect the split impedance ratio of the attenuator. Thus, $$\frac{\dfrac{1}{1/R1 + j\omega' C1}}{\dfrac{1}{1/R2 + j\omega' C2}} = \frac{\dfrac{R1}{1 + j\omega' R1C1}}{\dfrac{R2}{1 + j\omega' R2C2}} = \frac{R1}{R2}$$

Generally speaking, every Fourier component is divided to reflect the resistance ratio of the resistors R1/R2 regardless of the frequency of the voltage and, therefore, an arbitrarily applied voltage having any given waveform will be attenuated to show the ratio of R1/R2. Then, only the RF component of the divided (U+Vcosω t) is picked up by resistance/capacitance coupling. If the coupling capacitance is Cg and the coupling resistance is Rg, the output voltage will be $$V'R1/R2'Rg/(Rg+1/J\omega' Cg)$$

If a value less than 1/100 of that of Rg is selected for 1/ω' Cg, the output voltage will be $$V'R1/R2'0.99995 \sim V'R1/R2$$

that will give rise to an error, if any, less than $5\times10^{-5}$ because the phase of the impedance of the coupling capacitance is shifted by 90 degree on a complex plane. Then, the output voltage is compared with reference voltage $$V_o'R1/R2$$

for calibration and control.

As described in detail, with a method of controlling a according to the present invention, the peak value V of the RF voltage and the DC voltage are precisely controlled hy directly comparing the positive or negative peak value U+V or U–V of the voltage U+Vcosω t being applied to the rods of one of the pairs or the negative or positive peak value —U–V or —U+V of the voltage —U–Vcosω t being applied to the rods of the other pair with a reference voltage to he precisely controlled and feeding hack the difference to the modulation circuit of the RF amplifier for generating the RF voltage to minimize the difference. The voltages U and —U are generated on the basis of the reference voltage and the controlled RF voltage is superimposed on a DC voltage to produce precisely controlled voltages U+Vcosω t and —U–Vcosω t to be applied to the respective pairs of rods. As a result, no non-linearity appears in the U/V ratio unlike the case of any comparable known techniques and the operation of the quadrupole mass spectrometer does not significantly rely on the performance of each component of the spectrometer. In fact, the dependency on the performance of each component of the spectrometer is negligible with the method of the present invention. Consequently, the scanning line of the quadrupole mass spectrometer is highly linear and does not dependent on the mass number (and therefore the value of U or V). Additionally, it is stable because it is not affected by the temperature characteristics of the component devices. If the quadrupole mass spectrometer utilizes the first stable region, it can scan with a constant ΔM value from mass number 1 up to large mass numbers to enhance the quantifiability and the stability of the quadrupole mass spectrometer. If this method is applied to the second stable region, a high resolution is realized regardless of the mass number and two doublets of HD-$^3$He and $D_2$-$^4$He that have been unachievable can be precisely realized on the spectrum scanning line and enhance the quantifiability.

We claim:

1. A method of controlling a quadrupole mass spectrometer comprising two pairs of hyperboloidal columns or cylindrical rods arranged in vacuum, the rods of each pair being disposed accurately in parallel with each other, a voltage of U+Vcosω t obtained by overlaying an RF voltage on a DC voltage being applied to one of the pairs of rods, another voltage of —U−Vcosω t being applied to the other pair of rods, ions of gaseous substances and/or evaporated solid substances to be analyzed being caused to be focussed to the central portion of the quadrupole section, Mathieu's differential equation being used for the equations of motion for ions employing x- and y-coordinates running perpendicular to the center axis of ions moving inside the quadrupole section, ions having a specific ratio of the mass number to the electric charge being made to pass through the quadrupole section by selecting appropriate values for U and V so as to make parameters a and q of the equations stay in the first or second quadrant of the coordinate system or changing the values of U and V so as to make them pass through part of the first or second quadrant in order to detect the types of the ions or obtain a mass spectrum, wherein the peak value V of the RF voltage and the DC voltage are precisely controlled by directly comparing the positive or negative peak value U+V or U−V of the voltage U+Vcosω t being applied to the rods of one of the pairs or the negative or positive peak value —U−V or —U+V of the voltage —U−Vcosω t being applied to the rods of the other pair with a reference voltage to be precisely controlled and feeding back the difference to the modulation circuit of the RF amplifier for generating the RF voltage to minimize the difference and that the voltages U and —U are generated on the basis of the reference voltage and the controlled RF voltage is superimposed on a DC voltage to produce precisely controlled voltages U+Vcosω t and —U−Vcosω t to be applied to the respective pairs of rods.

2. A control circuit arrangement for controlling a quadrupole mass spectrometer comprising two pairs of hyperbolic columns or cylindrical rods arranged in vacuum, the rods of each pair being disposed accurately in parallel with each other, a voltage of U+Vcosω t obtained by overlaying an RF voltage on a DC voltage being applied to one of the pairs of rods, another voltage of —U−Vcosω t being applied to the other pair of rods, ions of gaseous substances and/or evaporated solid substances to be analyzed being focussed to the central portion of the quadrupole section, Mathieu's differential equation being used for the equations of motion for ions employing x- and y-coordinates running perpendicular to the center axis of ions moving inside the quadrupole section, ions having a specific ratio of the mass number to the electric charge being made to pass through the quadrupole section by selecting appropriate values for U and V so as to make parameters a and q of the equations stay in the first or second quadrant of the coordinate system or changing the values of U and V so as to make them pass through part of the first or second quadrant in order to detect the types of the ions or obtain a mass spectrum, wherein the arrangement comprises a modulation circuit, an RF amplifier circuit for generating an RF voltage to be applied to one of the rod pairs of the quadrupole mass spectrometer, a DC voltage generating circuit for generating a DC voltage to be applied to the rods of the other rod pair of the quadrupole mass spectrometer, a circuit including a high speed diode with a small reverse current, a reverse withstand voltage greater than 2V and a short reverse recovery time typically 35 nsec and a resistor for generating an error signal voltage and connected between the terminals for receiving the voltages to be applied to the rods of the quadrupole mass spectrometer and a highly precise reference voltage generating terminal to be controlled, an operational amplifier circuit having a gain small relative to the RF voltage but sufficient relative to the DC signal voltage and also having frequency characteristics adapted to selectively amplifying only the voltage generated by the error signal generating resistor circuit or the DC error voltage produced as the difference between the superimposed RF voltage and the DC voltage and a feedback circuit for feeding back the DC error signal from the operational amplifier to the modulation circuit of the RF amplifier circuit for generating an RF voltage to minimize the DC error signal.

3. A control circuit arrangement for controlling a quadrupole mass spectrometer comprising two pairs of hyperboloidal columns or cylindrical rods arranged in vacuum, the rods of each pair being disposed accurately in parallel with each other, a voltage of U+Vcosω t obtained by superimposing an RF voltage on a DC voltage being applied to one of the pairs of rods, another voltage of —U−Vcosω t being applied to the other pair of rods, ions of gaseous substances and/or evaporated solid substances to be analyzed being focussed to the central portion of the quadrupole section, Mathieu's differential equation being used for the equations of motion for ions employing x- and y-coordinates running perpendicular to the center axis of ions moving inside the quadrupole section, ions having a specific ratio of the mass number to the electric charge being made to pass through the quadrupole section by selecting appropriate values for U and V so as to make parameters a and q of the equations stay in the first or second quadrant of the coordinate system or changing the values of U and V so as to make them pass through part of the first or second quadrant in order to mass analyse the ions or obtain a mass spectrum, wherein the arrangement comprises a modulation circuit, an RF amplifier circuit for generating an RF voltage to be applied to the rods of one of the rod pairs of the quadrupole mass spectrometer, a DC voltage generating circuit for generating a DC voltage to be applied to the rods of the other rod pair of the quadrupole mass spectrometer, a circuit including a high speed diode with a small reverse current, a reverse withstand voltage greater than 2 V and a short reverse recovery time typically 35 nsec and a resistor for generating an error signal voltage and connected between the terminals for receiving the voltages to be applied to the rods of the quadrupole mass spectrometer and a highly precise reference voltage generating terminal to be controlled, an RF voltage pick up circuit for selectively picking up only the RF voltage of the voltage U+Vcosω t or —U−Vcosω t being applied to the rods of the quadrupole mass spectrometer and comparator circuit for comparing the RF voltage from the RF voltage pick up circuit with the reference voltage, the output signal of said comparator circuit being fed back to the modulation circuit of the RF amplifier circuit for generating an RF voltage to minimize the DC error signal.

4. A control circuit arrangement for controlling a quadrupole mass spectrometer according to claim 3, wherein the RF voltage pick up circuit comprises an attenuator formed by connecting a resistor and a capacitor in parallel to show a constant split ratio over the entire frequency range including DC.

* * * * *